United States Patent
Dury

(10) Patent No.: US 9,203,957 B2
(45) Date of Patent: *Dec. 1, 2015

(54) METHOD AND SYSTEM FOR TELEPHONE MESSAGE MANAGEMENT

(71) Applicant: VTech Telecommunications Limited, Tai Po, New Territory (HK)

(72) Inventor: James Dury, Vancouver (CA)

(73) Assignee: VTech Telecommunications Limited, Tai Po (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/273,435

(22) Filed: May 8, 2014

(65) Prior Publication Data
US 2014/0314217 A1    Oct. 23, 2014

Related U.S. Application Data

(63) Continuation of application No. 12/098,829, filed on Apr. 7, 2008, now Pat. No. 8,755,497.

(51) Int. Cl.
*H04M 1/64* (2006.01)
*H04M 3/42* (2006.01)
*H04M 1/57* (2006.01)
(Continued)

(52) U.S. Cl.
CPC .......... *H04M 3/42059* (2013.01); *H04M 1/573* (2013.01); *H04M 1/642* (2013.01); *H04M 1/72502* (2013.01); *H04M 3/53333* (2013.01); *H04M 1/72563* (2013.01)

(58) Field of Classification Search
CPC .. H04M 3/533; H04M 3/53333; H04M 3/493

USPC ................. 379/67.1, 76, 88.18, 88.19, 88.27; 455/415, 462

See application file for complete search history.

(56) References Cited

U.S. PATENT DOCUMENTS

| 4,985,913 | A |   | 1/1991 | Shalom et al. |
|---|---|---|---|---|
| 5,400,393 | A | * | 3/1995 | Knuth et al. ................ 379/88.27 |
| 5,699,410 | A | * | 12/1997 | Imamura et al. ........... 379/88.16 |

(Continued)

FOREIGN PATENT DOCUMENTS

GB    2280084    1/1995

*Primary Examiner* — Fan Tsang
*Assistant Examiner* — Van D Huynh
(74) *Attorney, Agent, or Firm* — Steptoe & Johnson LLP

(57) ABSTRACT

A system for managing telephone messages played by a telephone includes an integrated telephone answering device configured to playback a plurality of outgoing messages. The system further includes a first memory section to store a default outgoing message and a second memory section to store one or more custom outgoing messages. The system further includes a handset operable to send outgoing messages for storage in the base unit and to send information related to outgoing messages for storage in a database of the base unit, the information including an outgoing message identifier associated with each outgoing message and a list of calling numbers associated with each outgoing message identifier. The system further includes a processor operable to receive an indication of a playback outgoing message request, to determine a calling party number associated with the outgoing message identifier, to retrieve an outgoing message identifier associated with the calling party number, and to send a signal to the integrated telephone answering device to playback an outgoing message associated with the outgoing message identifier.

24 Claims, 3 Drawing Sheets

(51) Int. Cl.
*H04M 1/725* (2006.01)
*H04M 3/533* (2006.01)

(56) References Cited

U.S. PATENT DOCUMENTS

| | | | |
|---|---|---|---|
| 6,148,213 A * | 11/2000 | Bertocci et al. | 455/462 |
| 6,226,362 B1 | 5/2001 | Gerszberg et al. | |
| 6,266,399 B1 * | 7/2001 | Weller et al. | 379/88.19 |
| 6,347,225 B1 | 2/2002 | Nishiyama | |
| 6,377,664 B2 | 4/2002 | Gerszberg et al. | |
| 6,385,305 B1 | 5/2002 | Gerszberg et al. | |
| 6,631,181 B1 * | 10/2003 | Bates et al. | 379/88.18 |
| 7,627,094 B2 * | 12/2009 | Kraft et al. | 379/76 |
| 2003/0095640 A1 * | 5/2003 | Hatamura | 379/67.1 |
| 2005/0047587 A1 | 3/2005 | Green, III | |
| 2005/0148324 A1 * | 7/2005 | Henderson | 455/415 |
| 2005/0271188 A1 | 12/2005 | Kraft et al. | |

* cited by examiner

METHOD AND SYSTEM FOR TELEPHONE MESSAGE MANAGEMENT

CROSS-REFERENCE TO RELATED APPLICATIONS

The present application is a continuation of U.S. patent application Ser. No. 12/098,829, filed Apr. 7, 2008, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The present disclosure relates to telephones, and more particularly, for communications using a telephone answering device.

BACKGROUND

Many modern telephones are equipped with an integrated telephone answering device (ITAD) that is typically integrated within a base unit of a telephone. Known ITADs provide an easy to use interface at the base unit that allow a user (the ITAD owner and called party) to record a message to be played to a caller when an incoming call is not picked up. In typical systems, a single short message is played to any caller when the phone is not taken off the hook after a predetermined amount of rings. In known systems, it is possible for the user to initiate recording and subsequently play recorded messages received from a caller by pressing either a single button, or perhaps two buttons provided on the base unit. Moreover, the user can typically dial into the telephone remotely to play messages left in the ITAD, thus providing a convenient means for a user to retrieve caller messages. In addition, because recording and playback only requires one or two buttons, ITADs can be incorporated into relatively inexpensive base units that have a simple user interface. For example, the base unit may simply include buttons to operate the ITAD and a cradle for a handset.

Typical ITAD systems, however, provide only a limited amount of information to a caller whose call is not answered by a live person. Known ITAD systems typically have a limited amount of storage space for a user to record a message that can give the caller information such as information confirming the name or number of the called party and directions as to how to leave a message. Known ITADs are configured to play the same general message in response to any incoming call that is not answered by a live person. Often, however, a user may wish to provide more timely information to a potential calling party than is contained in a first, general pre-recorded message, such as information indicating that the called party is out of town for a period of time, or current contact information that the caller can use to contact the called party through other means besides the telephone associated with the ITAD. However, this requires the user to record a new message for the ITAD, which replaces the first, general, message and is then played in response to any incoming unanswered call. When a user returns from out of town, for example, the user, having replaced the general message with a more timely and specific message, then has to reenter a message, such as the first general pre-recorded message, to provide appropriate information to calling parties. This process of updating the message played by an ITAD is cumbersome for the called party ITAD user, especially if the update process has to be performed often and is not ideally suited to the information needs of a wide variety of potential calling parties who may include complete strangers as well as close family members.

One attempt to address the above problem, described in U.S. Pat. No. 4,985,913 to Shalom et al. ("Shalom"), involved a telephone answering machine that included a microcomputer that was connected over a common bus to a recording device and full alphanumeric keypad with function keys. The telephone answering machine facilitated recording several different messages and facilitated assigning of a user telephone number to one of the several messages so that a message could be played based on the identified phone number.

Another example of an answering machine where more than one message can be played back is described in a series of patents to Gerszberg et al. ("Gerszberg"), namely, U.S. Pat. Nos. 6,226,362; 6,377,664; and 6,385,305. The latter machine included a video display and capability for playback of video announcement messages.

However, both Gerszberg and Shalom disclose relatively complex procedures and hardware systems that cannot readily be incorporated into typical home phones having a simple base unit where the user interface may be of minimal complexity.

SUMMARY

In accordance with an aspect, a system for managing telephone messages played by a telephone includes an integrated telephone answering device configured to simultaneously store a plurality of outgoing messages (OGMs). In one aspect, the integrated telephone answering device is included in a base unit of a telephone. The system further includes a memory located in the base unit for receiving from a handset and storing in a data structure information related to outgoing messages, such as an outgoing message identifier associated with at least one of the outgoing messages, and a list of calling numbers associated with each outgoing message identifier. Preferably, the system further includes a user interface located in a handset of the telephone and designed to allow a user to view information, such as calling party and OGM identifiers, and to select and enter calling party phone numbers for storage in a data structure that associates the calling party phone number with an OGM identifier. The system further includes a processor operable to receive an indication of a request to playback an OGM to determine a calling party number associated with the playback OGM message, to retrieve an OGM identifier associated with the calling party number, and to send a signal to the integrated telephone answering device to playback an OGM associated with the OGM identifier.

Accordingly, the system can retrieve and playback an OGM tailored to a caller associated with the calling party number.

In accordance with another embodiment, a method for managing outgoing telephone messages in a telephone comprises a step of storing a plurality of outgoing messages in an integrated telephone answering device that is located, for example, in a base unit of the telephone. In one aspect, all outgoing messages save a default message are entered for storage in the integrated telephone answering device using a handset of the telephone. The method further involves storing a plurality of outgoing message indicators in a memory wherein each outgoing message indicator is associated with a respective outgoing message. In a further step, a calling party number is stored in a memory such that the calling party number is associated with a selected outgoing message indicator. In one aspect, all outgoing message indicators and associated calling party numbers are stored into a data structure of a base unit by using a handset of the telephone to transmit the outgoing messages indicators and associated calling party numbers to the base unit. In a further step, a signal to play an outgoing message in response to an incoming telephone call is received. A calling party number associated with the incoming telephone call is determined. An outgoing message indicator associated with the calling party number is retrieved and a signal is sent to play the respective outgoing message corresponding to the retrieved outgoing message indicator.

In a further embodiment, a method for managing an integrated telephone answering device comprises storing a plurality of outgoing messages in the integrated telephone answering device. A selected outgoing message is stored as a default outgoing message. A signal to playback an outgoing message in response to an incoming call is received. A memory structure comprising one or more calling party numbers and a plurality of outgoing message indicators associated with respective outgoing messages is queried. If a calling party number associated of the incoming call is found in the memory structure, the outgoing message indicator associated with the calling party number is retrieved and a signal to play the corresponding outgoing message is sent to the integrated telephone answering device. If the calling party number is not found in the memory structure, a signal to play the default outgoing message is sent to the integrated telephone answering device.

BRIEF DESCRIPTION OF THE DRAWINGS

The above-mentioned and other features and advantages of this disclosure and the manner of attaining them will become more apparent, and the disclosure itself will be better understood by reference to the following description taken in conjunction with the accompanying drawings.

DETAILED DESCRIPTION

Figure 1:
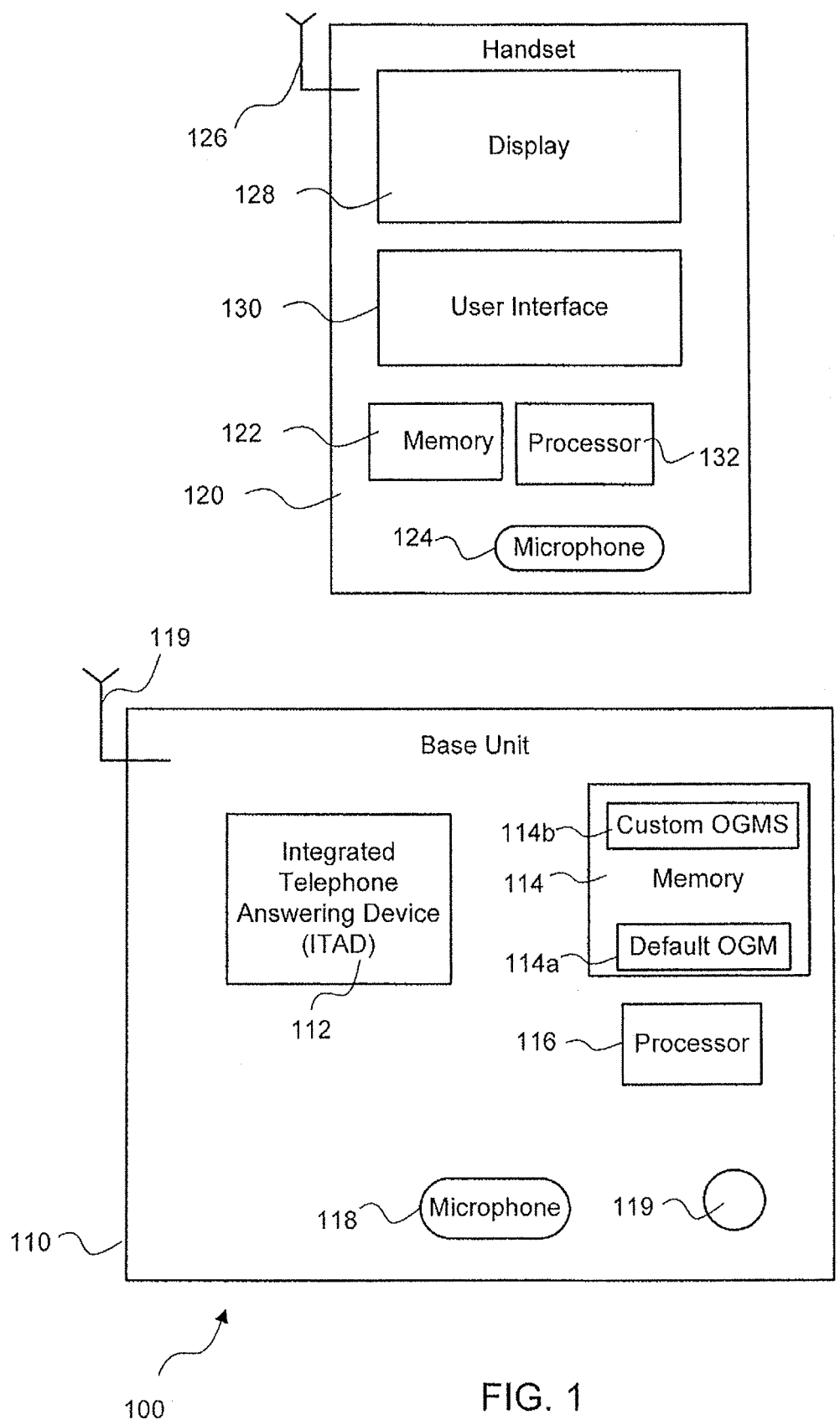
FIG. 1 depicts in schematic form a system for managing outgoing telephone messages, in accordance with an embodiment.

The present disclosure will be described with reference to the accompanying drawings. Corresponding reference characters indicate corresponding parts throughout the several views. The description as set out herein illustrates an arrangement of an embodiment of the present disclosure and is not to be construed as limiting the scope of the disclosure in any manner.

Embodiments of the present disclosure provide a system and method for managing outgoing messages (OGMs) that are provided to a calling party who dials a telephone number associated with a called party. As described in detail with respect to the figures, the system and method of the present disclosure allow a user to conveniently store and select for playback an OGM from a plurality of OGMs, such that the selected OGM is tailored according to the potential calling party, that is, the selected OGM is specific to the calling-party (also termed "caller"). The system also provides a means for automatic playback of a caller-specific OGM selected from a plurality of OGMs where the caller-specific OGM is played in response to an unanswered incoming phone call received at a called party telephone.

The system is capable of being incorporated with little hardware modification of known configurations of telephones, such as telephones having a simple base unit and handset. For example, by distributing hardware and programming functions related to management of OGMs, between a handset and a base unit, a base unit equipped with an ITAD can be configured to provide a variety of calling party-specific OGMs without the need to incorporate complicated user interface hardware in the base station.

FIG. 1 depicts a system 100 for managing outgoing telephone messages, in accordance with an embodiment. System 100 includes a base unit 110 and a handset unit 120 that is configured to communicate with base unit 110 over a wireless link. In one embodiment, system 100 is a cordless telephone system in which base unit 110 is a cordless base unit that is configured to communicate with handset 110 using a DECT, WDCT, or other wireless communications protocol that is designed for local communication (communication range generally less than about 1000 meters).

In the embodiment depicted in FIG. 1, base unit 110 includes an integrated telephone answering device (ITAD) 112 that is configured to play an outgoing message in response to an incoming call received at telephone 100 (the terms "system 100" and "telephone 100" are used interchangeably hereinafter). For example, ITAD 112 can be set to play an outgoing message if telephone 100 is not taken off-hook after a predetermined interval, which denotes for example, a predetermined number of rings received from an incoming call, or a predetermined amount of time from when the incoming call is detected at phone 100. ITAD 112 is preferably further configured to receive and store incoming messages from calling parties who may leave a message in response to the played outgoing message.

In accordance with an embodiment, ITAD 112 is configured to play a caller-specific OGM that is chosen from one of a plurality of stored OGMs. The term "caller-specific OGM" refers to the fact that the system is configured to determine which of a plurality of OGMs to play based upon at least one specific feature associated with an incoming calling party (caller), as described further below.

For example, a user may wish to record for playback two or more different type of OGMs: a first OGM (default OGM) to be used for "the general public" may include a standard message asking the calling party to leave a message, while a second OGM designed for close friends and family may provide additional information, such as a cell phone number or likely whereabouts. Another type of OGM a user may wish to record for playback is a short-term or one-off message designed only for a particular caller. By storing a plurality of OGMs and providing a means to select which OGM to play in response to an incoming call, the disclosed system thus facilitates the ability to provide more useful information to selected calling parties than may typically be contained in a generic OGM, while at the same time restricting information given to other callers, such as unknown callers or known callers for whom only limited information is to be given.

In one embodiment, system 100 is configured to select for playback a caller-specific OGM based upon the phone number of the incoming call. Thus, system 100 is operable to determine the phone number of an incoming calling party and to thereby determine an appropriate OGM to be played back to the calling party based upon the incoming phone number.

In accordance with embodiments, base unit 110 provides a means for storing a default OGM in a separate region or section of memory as opposed to custom OGMs, such as those designed for friends, family, or one-of-a-kind OGMs. The storage of custom OGMs separate from a default OGM affords benefits in management of OGMs, as described further below.

FIG. 1 illustrates that base unit 110 further includes a memory 114, which includes information related to potential calling parties and information related to the plurality of OGMs stored by ITAD 112. Memory 114 could be more than one memory device and could be disposed within ITAD 112 or in a separate part of base unit 110. Preferably, the calling party information stored in memory 114 includes a list of caller phone numbers, and one or more OGM identifiers, as described further below. The list of caller phone numbers can include a plurality of caller phone numbers, wherein one or more of the plurality of phone numbers can be associated with an OGM identifier. The OGM identifier stored in memory 114 can be, for example, a descriptive word that is linked to a specific OGM stored in ITAD 112. For example, a first identifier could be "family message" and second identifier could be "general message." Alternatively, the identifiers could simply be "OGM1," "OGM2," and the like.

In one embodiment, memory 114 is part of the ITAD and is configured to store OGMs therein, in addition to calling party information.

Base unit 110 further includes a processor 116 (which can be more than one processor) that is operable to identify an incoming phone number, for example, using known caller ID functionality. Processor 116 is further operable to query memory 114 and to assign an OGM to the incoming phone number based on the memory query. Accordingly, after a phone number of an incoming call is identified, memory 114 can be searched to see if the incoming phone number is contained therein. Based on the results of the search, as described in detail below, processor 116 then assigns for playback a specific OGM tailored for the calling party corresponding to the incoming phone call. For example, processor 116 could ascertain that a first incoming phone number is contained in memory 114 and corresponds to an "OGM3" that is a message to be played for family members of the called party. Accordingly, processor 116 can send a signal to ITAD 112 to play "OGM3" if the first incoming call does not go off-hook after five rings, for example. Processor 116 could be further configured such that if a second incoming call is determined to correspond to a phone number that is not contained in memory 114, the call is assigned to an "OGM1" corresponding to a generic outgoing message. Accordingly, processor 116 can send a signal to ITAD 112 to play "OGM 1" if the second incoming call does not go off-hook after five rings, for example.

Although the above-mentioned functionality could be programmed within a processor 116, in other embodiments, processor 116 could be configured to invoke and perform the steps of a separate software program that embodies the functions described above in response to an incoming phone call.

Base unit 110 also includes a microphone 118 that allows a user to record an OGM to be stored in ITAD 112. This could be accomplished by providing a record button 119 or other simple means that activates recording of a message using microphone 118.

In one embodiment, the OGM recorded by the base unit is stored as the "default" OGM in ITAD 112. The default OGM represents an OGM that is played back by ITAD 112 in response to any unanswered incoming call, unless system 100 determines that the phone number of the incoming call is associated with an OGM different from the default OGM. Thus, for example, for incoming calls associated with phone numbers that are not contained in memory 114, ITAD 112 can be configured to playback the default OGM.

In one embodiment, base unit 110 is configured so that only a single message recorded by base unit 110 is stored at any one time. In accordance with this embodiment, the telephone system 100 could be configured such that other OGMs, that is, "special" OGMs that are linked to specific phone numbers only, could be recorded only through use of handset 120 whose operations are described in detail below. In this manner, a user operating base unit 110 could be restricted to only recording and modifying a default OGM, In other words, base unit 110 can be configured such that only a single message received through microphone 118 can be stored for playback in ITAD 112 at any one time. For example, as described further below, base 110 can be configured such that it recognizes a select portion of storage space in ITAD 112 to be occupied by a default OGM. Any message recorded through microphone 118 would accordingly be stored in the select portion of storage space and replace the previous default OGM previously recorded there. Thus, besides button 119, a user interface of base unit 112 need not include a keypad, display, or additional soft keys that would facilitate, for example, designation, recording, and simultaneous storage of multiple outgoing messages.

In accordance with an embodiment in which memory 114 is designed for storing OGMs, memory 114 is provided with a first section 114a for storing a default OGM and a second section 114b that is separate from section 114a for storing custom OGMs. For example, a default OGM could be recorded through microphone 118. In this embodiment, when a user presses button 119 to record a new default OGM, base unit 110 recognizes that button 119 has been depressed and thereby knows that the OGM being recorded is to be stored in section 114a. Section 114a of memory 114 preferably is configured with sufficient memory for the user to record a default message of a reasonable length, for example, sufficient memory to store a 90 second message. Because the default OGM is to be stored separately from custom OGMs, which are stored in section 114b, the user is assured that there will always be space available to record the default OGM, and need not have any knowledge of whether any custom OGMs are stored in memory 114 or what the length of such messages might be. Accordingly, recording and re-recording of default OGMs can proceed through simply touching a record button 119.

In accordance with an embodiment, a user can also record the default OGM for storage in memory section 114a using handset 120, as described in more detail below.

In accordance with one embodiment, any OGMs to be stored in memory section 114b must be recorded through handset 120. For example, in one embodiment in base unit 110, button 119 comprises the only user interface available for recording and storing OGMs using base unit 110. In accordance with the embodiment described above, in which OGMs recorded through button 119 are directed to memory section 114a, a user is therefore precluded from recording OGMs for storage in memory section 114b using base unit 110.

Memory section 114b can be apportioned with sufficient memory to record a plurality of OGMs. Accordingly, as described below, a user can record one or more custom OGMs for storage in memory section 114b through a handset 120. In accordance with an embodiment, if memory section 114b becomes full while a user is recording a custom OGM, the user can be prompted to free up memory space in memory section 114b if the user wishes to extend the OGM being recorded.

Referring now to handset 120, in accordance with embodiments, handset 120 is operable to receive, store, manipulate and transmit to base unit 110 OGMs and information related to OGMs to be stored in base unit 110. In accordance with embodiments, handset 120 can represent one of a plurality of similar cordless handsets in a cordless telephone system.

In accordance with one embodiment, handset 120 is configured such that OGMs and OGM-related information entered and manipulated by handset 120 are not permanently stored in the handset. However, in other embodiments, handset 120 can be configured to store OGMs, OGM-related information, or both.

In particular, in accordance with embodiments, handset 120 is configured to allow a user to establish a data communication session with base unit 110 to perform one or more or the functions numbered immediately below. The data communications session can be established over a radio frequency link between handset 120 and base unit 110. According to an embodiment, in a system 100 having a plurality of handsets 120, only one data communications session can be established at a time to avoid conflicting communications with a base unit.

Handset 120 can be configured for:

1) Recording and transmitting one or more custom OGMs for storage in base unit 110. In accordance with embodiments, a user can record an OGM using handset 120 and transmit the recorded OGM to base unit 110 while the communication session is active. In accordance with embodiments, the location for storage of an OGM recorded in handset 120 can be determined either automatically or with the aid of input received from the user. For example, system 100 could be configured so that any recorded OGM transmitted from handset 120 to base unit 110 is allocated by default to section 114b, the portion of memory for "custom" OGMs. Accordingly, in the absence of any user input, during recording of a streamed OGM or after an OGM is recorded by the user in handset 120, the recorded OGM is sent to base unit 110 for storage in memory section 114b. A user wishing to record an OGM for storage and use as the default OGM in memory section 114a, would thereby have to enter an affirmative indication that the current OGM to be transmitted from handset 120 to base unit 110 is to be stored as the default OGM. Alternatively, the handset 110 could be configured to require a user to select a destination for any recorded OGM, such that an OGM recorded at handset 120 would not be transmitted and stored at base unit 120 until a designation for storage as a custom OGM or a default OGM was entered, which would trigger the base unit to 110 to direct the received OGM to a respective memory sector 114b or 314a.

2) Retrieving OGM-related information from base unit 110. As described in detail below, OGM-related information that is stored in memory 114 of base unit 110 can be retrieved by handset 120 during a data communications session.

3) Viewing the OGM-related information. Handset 120 is configured with a display 128 for viewing OGM-related information retrieved from base unit 110.

4) Manipulating the OGM-related information. As described in detail below, handset 120 is provided with means to manipulate the OGM-related information retrieved from base unit 110. The manipulation could involve updating a caller list with corresponding OGM identifiers and subsequently displaying the updated list to the user on display 128.

5) Sending any updated OGM-related information to base unit 110 for storage. During a data communications session, updated or new OGM-related information can be sent to base unit 110 for storage.

In addition, in embodiments in which handset 120 is configured to store OGMs or OGM-related information, handset 120 could be configured to perform such storage operations either during a data communications session with base unit 110 or at a time in which no data communications session is active.

Referring again to FIG. 1, handset 120 includes a microphone 124 that allows a user to locally record one or more OGMs, and a radio transceiver 126 that is configured to transmit recorded OGMs and other OGM-related information to base unit 110 via transceiver 121. In accordance with one embodiment, once a data communications session (also termed "data session" herein) is established between handset 120 and base unit 110, handset 120 is configured to stream an OGM from handset 120 to base unit 110 during recording of the OGM through microphone 124, such that the OGM is not stored permanently in handset 120. Accordingly, handset 120 need not include memory space necessary to store one or more OGMs. However, as mentioned above, in other embodiments, handset 120 could be configured with memory to store OGMs locally in the handset.

In accordance with one embodiment, by providing a separate memory section 114b in base unit 110 for storage of custom messages, by requiring that messages to be stored in memory section 114b be entered through handset 120, and by requiring an affirmative indication from a user of handset 120 that a recorded OGM is to be used as a default OGM, system 100 provides several advantages. As noted above, the user of base unit 110 is provided with a simple interface (button 119) for recording and re-recording a default OGM. The user is additionally provided with the flexibility of recording custom OGMs without the need of having a complex user interface on base unit 110. Moreover, the user is assured that the default OGM will not inadvertently be erased during operations to record custom OGMs, since the only way to erase the OGM stored in memory 114a is through use of the base unit 110, or through an affirmative selection at handset 120, both of which operations would put the user on notice that the default OGM is being erased.

In accordance with another embodiment, while an OGM message is being recorded and streamed to base unit 110, display 128 can be configured to alert a handset user if the memory space in memory 114b is full, so that the user can direct base unit 110 to free up space in memory 114b, if desired, to accommodate a new custom OGM. For example, base unit 110 could be configured to detect when the used space in memory 114b exceeded a threshold and to dynamically send an alert to handset 120 during a data communications session. Alternatively, a user can be provided with a menu means on handset 120 to query from base unit 110 the amount of memory (expressed for example in terms of recording time) available in memory 114b, the result of which query could be sent to display 128.

Thus, in accordance with an embodiment, by partitioning the recording of default OGMs and custom OGMs between respective base unit 110 and handset 120, system 100 facilitates a convenient and safe process for storing the default OGM, while at the same time facilitating a convenient process for recording and storing custom OGMs, without the necessity of having a complex user interface in base unit 110.

In accordance with an embodiment, during a data communications session, based on user input, handset 120 is configured to retrieve OGM-related information contained in memory 114 of base unit 110, to manipulate the retrieved information, and to resend the manipulated retrieved OGM-related information to the base unit 110 over the radio frequency link for storage. Such information can be stored in a data structure that includes OGM-related information, such as a list of OGM identifiers (e.g., OGM1, OGM2, and the like, or family, general, work, and the like). The term "data structure," as used herein, refers to any table, database, or electronic phone book, among other things, that stores information in an organized manner, wherein one type of information is correlated to another type of information. For example, the terms "outgoing message data structure," "OGM data structure," "outgoing message database," or "OGM database" each denote a table that is configured to include at least one OGM identifier and at least one piece of calling party information associated with that OGM identifier. At least one program or similar process that can access such a data structure is operable to correlate the OGM identifier to one or more pieces of calling party information.

As described in more detail below, in accordance with some embodiments, an OGM data structure includes a list of phone numbers that are each linked in the data structure to a specific OGM. In one embodiment, the data structure can be organized as a phone book-type structure that includes a plurality of calling party entries that each can include caller information such as caller phone number, caller name, other personal caller information, OGM identifier and ring tone to be played. If base unit 110 is not provided with a user interface to access or manipulate the OGM data structure, viewing and manipulation of such a data structure is performed solely through a handset 120.

In addition, in an embodiment, system 100 is configured such that all calling party information and OGM identifier information stored in memory 114 of base unit 110 is entered through handset 120. Thus, management of an OGM data structure located in base unit 110, as well as management of custom OGMs stored in base unit 110, is performed entirely by handset 120, even when handset 120 contains no provision for permanent storage of OGMs or OGM-related information. This averts the necessity of providing a complex user interface in base unit 110 that would be necessary to record and allocate a plurality of different OGMs for ITAD 112 and to program OGM data structures in memory 114.

As mentioned above, handset 120 further includes a display 128, which can be used for visually displaying information, such as calling party phone numbers, OGM identifiers, programming prompts, and the like. In accordance with embodiments, handset 120 includes user interface 130, which can include an alphanumeric key pad, scroll or other selection devices, and hot keys.

Handset 120 additionally contains a processor 132 that is configured to program information for storage in an OGM data structure contained in memory 114. In alternative embodiments, an OGM data structure can also be contained in memory 122. In accordance with an embodiment, handset 120 is configured to allow a user to designate OGM-related information to be sent to base unit 110. For example, in one aspect, a program stored in handset 120 is operable to allow a user to manipulate information retrieved from an OGM data structure of base unit 110 during a communications system. Thus, in accordance with the present disclosure, programming and updating an OGM identifier list, calling party numbers, and the like that are located in base unit 110, can be accomplished by using user interface 130 of handset 120.

User interface 130 allows the handset user to initiate a data communications session, retrieve desired OGM-related information from base unit 110 during the data session, modify the OGM-related information retrieved from base unit 110, and enter and send new OGM-related information or modified OGM-related information for storage in base unit 110.

In one embodiment, handset 120 includes a program or routine that allows a user to record a new OGM. The program or routine can be launched, for example using a combination of interface 130 and display 128. For example, display 128 can contain a main menu that allows the user to access, including an OGM menu, by use of interface 130. When the user selects an option in the OGM menu to record a new OGM recording is activated, and a message can be recorded through microphone 124. In one aspect, the program automatically prompts the user to name the newly recorded OGM, that is, to enter an OGM identifier. This OGM identifier can then be stored in a data structure, such as an OGM table or a phonebook that can include fields related to calling parties, as discussed further below. In another aspect, the program could automatically assign an OGM identifier to a newly-recorded OGM, such as "OGM4," which could be displayed to the user as a reminder at the time the new OGM is recorded.

Figure 2:
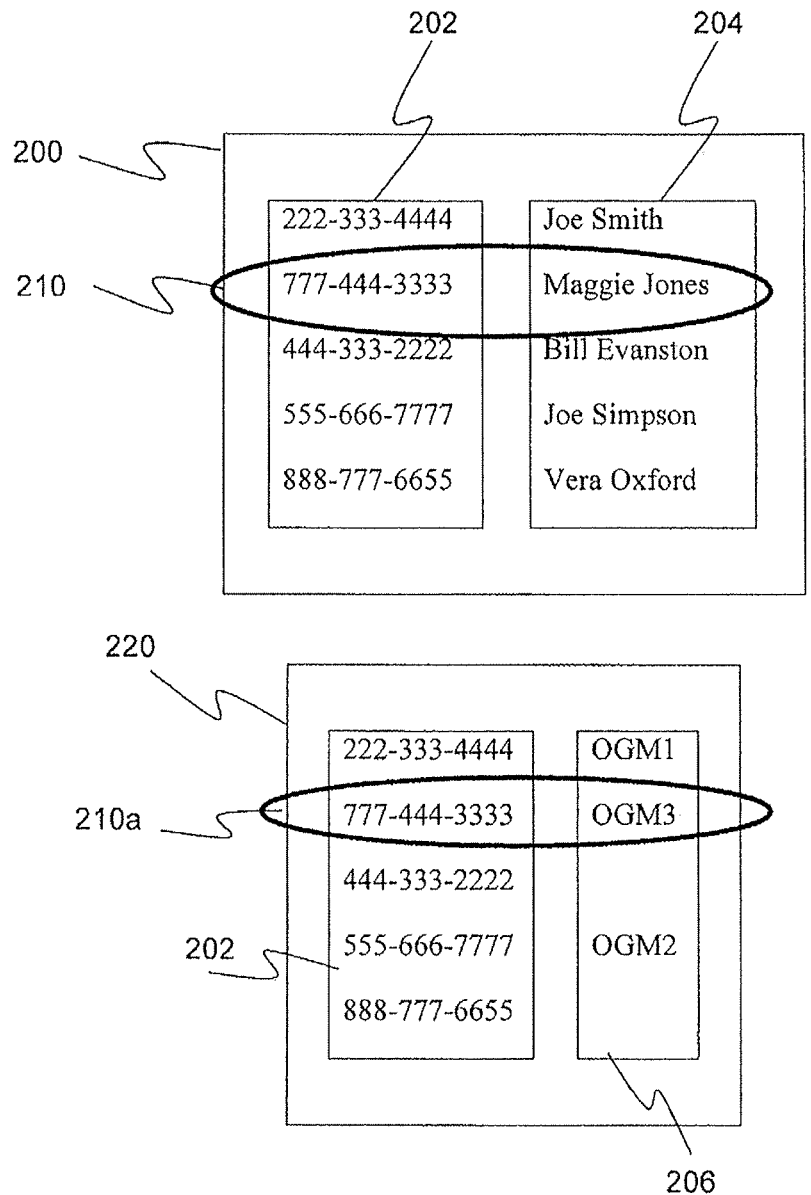
FIG. 2 illustrates an example of a phone book data structure contained in a handset and a related OGM data structure contained in a base unit, in accordance with an embodiment.

FIG. 2 illustrates the relation between a data structure 200 in handset 120 and a corresponding data structure 220 stored in base unit 110, in accordance with an embodiment. Data structure 200 (also termed "phone book") can be part of a phone book-type data structure that contains caller information, such as caller phone number and personal information. As such, data structure 200 as depicted in FIG. 2 can comprise a plurality of calling party entries, such as entry 210, where each entry (or "record") corresponds to a row in the data structure, and each row contains information from one or more of a plurality of fields that each contain a specific type of information related to calling parties. Field (column) 202 contains a plurality of caller phone numbers that can each be stored by known methods, or alternatively, in accordance with methods described below.

Field 204 can contain conventional caller personal information, such as name and address. For clarity, in the example illustrated in FIG. 2, only name information is shown in field 204. In accordance with an embodiment, each calling number entry in field 202 can have a corresponding entry in field 204.

A user can use phone book 200 to access a contact's phone number. For example, a user may be presented with a "phone book" menu that allows the user to scroll through a list of names, in order to find a desired contact's phone number, by selecting the contact name from the list. Although only a few entries are depicted in field 202, it will be readily appreciated that a phone book 100 could contain many hundreds or thousands of entries in both fields 202 and 204.

In accordance with an embodiment, the data stored in data structure 220 in memory 114 of base unit 110 can only be entered and/or modified using handset 120. For example, base unit 110 may not have an appropriate user interface, such as a keypad and display that would facilitate entry of such information. Accordingly, the information to be stored in data structure 220 is initially entered through handset 120 and then forwarded to base unit 110 during a data communications session. In accordance with embodiments, a user of handset 120 could select from entries in phone book 200 to update data structure 220 of base unit 110.

As depicted, data structure 220 in memory 114 of base unit 110 contains the same field 202 as in data structure 200. However, field 202 of data structure 220 need not contain the same amount of telephone number entries as stored in data structure 200. In accordance with an embodiment, data structure 220 only contains phone numbers that are associated with an OGM identifier, as depicted in field 206 of data structure 220. In accordance with the embodiment depicted in FIG. 2, personal information field 204 is absent from data structure 220. This allows memory 114 to be smaller than would be required if all personal information of phone book 200 were stored locally in memory 114.

In accordance with an embodiment, when a user of handset 120 wishes to update data structure 220 in base unit 110, the user can send information contained in phone book 200 to base unit 110. For example, a user may wish to assign a pre-existing OGM to a contact contained in the user's phone book 200 of handset 120. In the example illustrated in FIG. 2, the user may wish to assign an outgoing message (OGM3) to contact Maggie Jones so that when Maggie Jones subsequently places an unanswered telephone call to system 100, OGM3 will be played by ITAD 112. In accordance with alternative embodiments, the user could accomplish this with the aid of a phone book routine or a stand-alone "OGM" routine operable in handset 120.

In one embodiment, the user could launch a phone book 200 routine provided on handset 120, which could provide a series of contact entries, such as entry 210, that each include phone numbers of contacts and names of contacts. Although a handset display could be configured to display the entire entry 210, in one implementation, handset 120 only displays the user list 204 that contains user names alone. When the user reaches the desired name, the user could select the name, whereby a program operable in handset 120 could provide a series of menu options, among them a prompt to the user to see if the user desired to associate the name with an OGM identifier. If so, the user could be provided with a list of OGM identifiers, such as the OGM identifiers in list 206. The user would then select 'OGM3,' after which handset 120 knows to forward information related to Maggie Jones and OGM3 to base unit 110, which is recorded as entry 210a. The user need not know nor view the phone number of Maggie Jones in order for handset 120 to forward the phone number to base unit 110, since the phone number is already associated with Maggie Jones in record 210 of phone book 200, as depicted in FIG. 2. When the user enters a command or the handset 120 otherwise triggers a synchronization operation, handset 120 forwards information from record 210 for storage in data structure 220 of base unit 110. In accordance with alternative embodiments, system 100 can be configured to prompt the user to send the newly-updated information to base unit 110, or, alternatively, can be configured to automatically send the information to base unit 110. Because exemplary data structure 220, as shown in FIG. 2, is only configured to store calling party number and OGM identifier information, not all the information in Maggie Jones record 210 is copied into a corresponding data record 210a of data structure 220. Accordingly, the contact name does not appear in data record 210a.

In another embodiment, an OGM program separate from a phone book program provided on handset 120 could be configured to allow a user to enter a caller phone number either manually through a keypad or from a phone book that can be launched from within the OGM program.

In accordance with further embodiments, such operations to add or modify a record containing OGM-related information, such as record 210, can be performed by a user selecting a menu option through a combination of hot keys in user interface 130 or selecting menu items provided on display 128 that, once selected, allow the user to type information for storage in data structure 200. In other embodiments, entry of information into an OGM data structure can be assisted by prompts from the phone system, as described further below.

In accordance with embodiments in which data structure 220 only contains fields 202 and 206, data structure 220 can contain a large number of records, such as 210a, without requiring a large amount of memory, since each record only contains a phone number and an OGM identifier which can be limited to a brief set of alphanumeric symbols in accordance with the present disclosure. Accordingly, a base unit can store only the necessary information for providing a caller-specific OGM to a large number of calling parties without requiring a large memory.

In other embodiments, a data structure similar to data structure 220 could be stored in handset 120.

Figure 3:
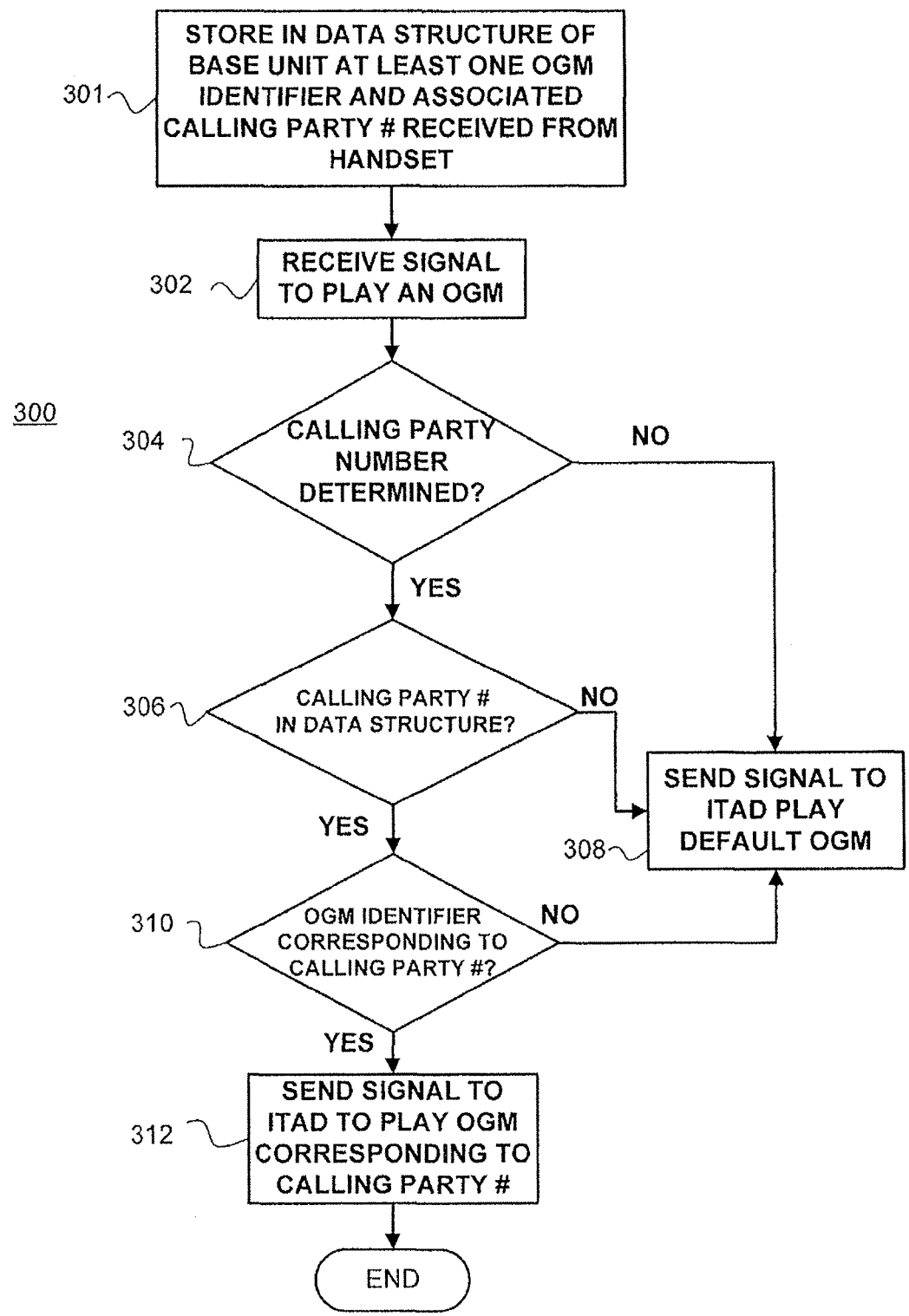
FIG. 3 illustrates exemplary steps involved in a method for managing outgoing messages of a telephone, in accordance with an embodiment.

FIG. 3 illustrates exemplary steps involved in a method 300 for managing outgoing messages of a telephone, according to an embodiment. In step 301, a base unit stores information received from a handset including at least one OGM identifier and calling party numbers associated with the at least one OGM identifier.

In step 302, a signal is received to play an OGM. This would occur, for example, when the call is not picked up after a predetermined interval, such that the system generates a signal that an outgoing message should be played.

In step 304, if the calling number of an incoming call is not determined, for example, if it is blocked, the process moves to step 308. If the calling number is determined, for example, using caller ID technology, the process moves to step 306.

In step 306, the signal that an outgoing message should be played triggers the system to determine if the calling party number is contained in the data structure containing the at least one OGM identifier, such as a phone book-type structure. For example, base unit 110 could query data structure 220 to determine if an identified calling party number is contained therein.

If the calling party number is not found in the data structure, the process moves to step 308 where a signal is sent to play a default OGM. If the calling party number is found, the process moves to step 310.

In step 310, the system checks to see if the data structure contains an OGM identifier corresponding to the calling party number. If no OGM identifier corresponding to the calling party is found in the data structure, the process moves to step 308 where a signal is sent to play a default OGM. If an OGM identifier corresponding to the calling party number is found, the process moves to step 312.

In step 312, a signal is sent to an ITAD in the phone system to play an OGM corresponding to the OGM identifier found in step 310.

It will be apparent to one of ordinary skill in the art that steps in the method described in FIG. 3 can be embodied in software, such as a program or routine, stored on a computer readable medium. For example, a routine that embodies steps 302-312 could be invoked every time an unanswered call triggers a signal that an OGM should be displayed.

In accordance with further embodiments, a handset, such as handset 120 is provided with a user interface, such as user interface 130 that can be used in conjunction with display 128 to facilitate programming of OGM-related information to be stored in handset 120 and/or base unit 110. For example, a program that allows a user to enter, delete or modify OGM related information can be launched by selecting a key in user interface 130 or a field displayed in display 128. For example, after selecting "OGM program," a main menu displayed on display 128 could offer options to record a new OGM, or to view a list of OGM identifiers corresponding to OGMs already stored in system 100. In one embodiment, in addition to the list of OGM identifiers, such as OGM1, OGM2, and OGM3, information associated with each OGM could be displayed next to the OGM identifier, such as the date and time recorded and message length. In addition, the total amount of available record time in the ITAD could be displayed on display 128.

A menu displayed on display 128 could further offer the user the choice of switching the default OGM from one OGM to a different OGM. For example, the default OGM could be indicated by a bullet, radio button, or other indicator in a view that displays the full list of OGM identifiers. The user could then scroll to a particular OGM entry to select or deselect the default OGM.

A main menu or sub-menu could further provide an option to delete an entire data structure, such as a table having a list of "special" OGMs, such that all incoming numbers would automatically trigger playing of the default OGM only. In such a case, a program could be configured to confirm this selection so that the entire table of special OGMs and related calling numbers is not inadvertently deleted.

In accordance with embodiments, a user can enter and modify OGM-related information into a phone system, such as system 100, in a variety of ways. In one method, a user can simply access a menu in a handset, such as handset 120 that allows the user to enter calling party and OGM information through a combination of key entry and/or selection from menu choices. A user could access, for example, a menu that allows manual entry of a calling party phone number to be stored in an OGM database. For example, the user may enter the phone number of a new acquaintance of the user and an indicator of the OGM to be played. The new acquaintance may be a new work colleague who is to receive an OGM designed for colleagues of the user, such as OGM2, which is then entered together with the other information related to the acquaintance. Alternatively, as described above, the user could designate a calling party phone number for storage with an appropriate OGM identifier by selection of a caller name from a pre-existing phone book entry selected by scrolling through a phone book.

In accordance with another embodiment, a user could be presented with an option to dynamically add or subtract an entry related to a calling party to an OGM data structure.

For example, a caller ID program operable to detect and display on a handset or base unit screen an incoming calling number could alert a user to an incoming call, either in real-time or in a call log. Once the user selects the calling party name corresponding to the incoming call, for example, at a handset display, the user could be prompted, among other things, to add the incoming calling party to a table or phone book containing a list of OGM identifiers. If the user selects an option to add the calling party to an OGM data structure and the OGM data structure is only located in the base unit, the handset could then establish a data communications session with the base unit to update the OGM data structure. For example, during the data communications session, the system could then check to determine that the incoming calling party number corresponding to the calling party name sent from the handset is not contained in the OGM data structure, and thereby trigger a prompt to query the user as to whether the user wishes to associate the incoming caller with an OGM identifier. Thus, if desired, the user could add the incoming number associated with the calling party in the call log to a table to associate the incoming number with a desired OGM identifier. For example, the user might recognize the incoming number as one belonging to a work colleague and might wish to add it to the list of calling numbers associated with the "OGM2" that is intended for work colleagues. Accordingly, by highlighting the incoming number, the user could be prompted to add the calling number to one of a plurality of OGMs that are displayed to the user.

In the above-described manner, the user can update and build an OGM table or database by a combination of actions such as highlighting already displayed telephone numbers on a call log display, scrolling through a list of calling numbers, and pressing "enter" or similar procedures to store a calling number in an OGM table without having to type alphanumeric keys to build an extensive amount of alphanumeric entries, such as an entire phone number. Moreover, the phone number corresponding to a new OGM entry can correspond to a calling party number already stored in the user's phone, such as in a phone book-type database. For example, a user may recognize a calling party number displayed on the handset as coming from a relative and may wish to store this in the user phone book. By selecting to store the calling party number of the user's relative under a section of an OGM table corresponding to "OGM3," the relative's phone number is linked to a message OGM3 wherein future unanswered calls received from that relative trigger playback of OGM3.

In addition, in accordance with an embodiment, the selection of OGM3 for linking to the relative's phone number could automatically place an OGM identifier corresponding to OGM3 in another type of database, such as a comprehensive phone book data structure that already contains the relative's calling party number. For example, referring again to data structure 200 of FIG. 2, the selection of OGM3 could result in the addition of an identifier, such as "OGM3" being added to field 206 in a row corresponding to that already containing the relative's phone number and personal information.

Accordingly, a phone book-type data structure containing OGM identifiers and/or a simple OGM table could be supplemented or constructed gradually with the aid of a call log in a telephone so that the user need not enter phone numbers completely manually.

Similarly, a phone system, such as handset 120, could be configured to provide a prompt to a user to delete an incoming calling party phone number from a pre-existing entry in an OGM table, For example, in accordance with an embodiment, the phone system could be programmed to determine whether the incoming number is contained in an OGM table, and if so, to automatically prompt the user as to whether the user wishes to delete the incoming number from that table. However, in other embodiments, the telephone system is configured such that the user must actively select a calling party number for deletion from an OGM table, wherein no prompt is automatically given to the user to delete an incoming calling party number that is already contained in an OGM table. For example, an incoming calling party number could be displayed in a call log. By selection of a calling party number, the user could be provided with a menu that allows the user to select from options such as "listen to message," "store #," and "delete # from OGM table."

In accordance with the above-described procedures, programming of phone numbers and associated OGM identifiers to be stored, modified or deleted from a data structure of a base unit can be accomplished using a handset linked to the base unit without extensive use of alphanumeric keys. For example, the user need only update an OGM data structure of the handset when incoming phone numbers are displayed in a call log or during an active call, followed by performing a synchronization of the handset OGM data structure with that of the base unit, as described above.

In accordance with an embodiment, instructions adapted to be executed by a processor to perform a method are stored on a computer-readable medium. The computer-readable medium can be a device that stores digital information. For example, a computer-readable medium includes a magnetic memory, a semiconductor memory, such as flash memory or DRAM, read-only memory (e.g., a Compact Disc-ROM, and the like), as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, and the like) to be ready to be executed by a processor.

The foregoing disclosure of the embodiments of the present disclosure has been presented for purposes of illustration and description. It is not intended to be exhaustive or to limit the invention to the precise forms disclosed. Many variations and modifications of the embodiments described herein will be apparent to one of ordinary skill in the art in light of the above disclosure.

Further, in describing representative embodiments of the present disclosure, the specification may have presented the method and/or process of the present disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible.

What is claimed is:

1. A cordless telephone system, comprising:
a base unit; and
a handset configured to wirelessly place and receive calls via the base unit;
wherein the base unit is configured to store a default outgoing message in a first memory section and to store a custom outgoing message in a second memory section;
wherein the cordless telephone system determines that a calling party number of a call is not contained in an outgoing message identifier database of the base unit and provides a prompt during the call, and associate the calling party number with an outgoing message identifier of a database based on the response of said prompt.

2. The system of claim 1, wherein the base unit further comprises an outgoing message identifier database comprising outgoing message identifiers received from the handset, wherein each outgoing message identifier corresponds to a respective custom outgoing message and at least one calling party number; and
wherein the base unit is further configured to receive a notification of a calling party number associated with an incoming telephone call, to retrieve from the database an outgoing message identifier associated with the calling party number, and to play an outgoing message associated with the retrieved outgoing message identifier if the incoming call is not answered after a predetermined interval.

3. The system of claim 2, wherein the database comprises a plurality of calling party entries that each includes a caller phone number.

4. The system of claim 3, wherein one or more of the calling party entries includes an outgoing message identifier.

5. The system of claim 4, wherein one or more of the calling party entries includes at least one of a caller name and a caller address.

6. The system of claim 1, wherein the base unit comprises:
a microphone configured to receive a first outgoing message for storage in the first memory section as the default outgoing message; and,
a button configured to activate recording of the first outgoing message through the microphone.

7. The system of claim 6, wherein an outgoing message received through the microphone of the base unit is stored in the first memory section as the default outgoing message.

8. The system of claim 6, wherein the handset comprises:
a microphone configured to receive an outgoing message; and
a radio transceiver configured to forward over a radio link to the base unit the received outgoing message.

9. The system of claim 8, wherein the base unit is further configured to automatically store the outgoing message received from the handset to the second memory section as a custom outgoing message.

10. The system of claim 8, wherein:
the handset is configured to prompt a user to designate whether the outgoing message is a custom outgoing message or a default outgoing message, and
the base unit is configured to store the outgoing message to the second memory section in response to the user indicating that the outgoing message is a custom outgoing message, and to store the outgoing message to the first memory section in response to the user indicating that the outgoing message is a default outgoing message.

11. The system of claim 8, wherein, the handset is configured to perform one or more of:
retrieving information from the database;
sending a newly-created outgoing message identifier to the base unit for storage in the database; and
sending a calling party number and an associated outgoing message identifier for storage in the database.

12. The system of claim 11, wherein the handset is configured to retrieve a calling party number for sending to the database of the base unit based upon a caller name selected from a phone book database located in the handset.

13. A method of using a cordless telephone system, the cordless telephone system having a base unit that is partitioned into at least a first memory section and a second memory section that is different than the first memory section, the method comprising:
storing a default outgoing message in the first memory section;
storing a custom outgoing message in the second memory section;
determining that a calling party number of a call is not contained in an outgoing message identifier database of the base unit; and
in response to said determining, providing a prompt during the call, and associate the calling party number with an outgoing message identifier of a database based on the response of said prompt.

14. The method of claim 13, further comprising:
storing an outgoing message database in the base unit including at least one outgoing message identifier and at least one calling party number associated with the at least one outgoing message identifier;
receiving notification of a calling party number corresponding to an incoming call;
querying the outgoing message database of the telephone to locate a calling party entry containing the calling party number and an outgoing message identifier associated with the calling party number; and playing an outgoing message stored in the second memory section that corresponds to the outgoing message identifier.

15. The method of claim 14, wherein the receiving the notification of the calling party number comprises using a caller ID device to identify the calling party number when an incoming call is received.

16. The method of claim 14, wherein the querying the database comprises:
   determining if the calling party number is contained in the database; and
   sending a signal to play the default outgoing message stored in the first memory section if the calling party number is not contained in the database.

17. The method of claim 14, further comprising:
   receiving an outgoing message via a microphone of the base unit in response to activation of a recording button of the base unit; and
   storing the received outgoing message in the first memory section as the default outgoing message.

18. The method of claim 14, further comprising:
   recording an outgoing message in the handset; and
   forwarding the outgoing message from the handset to the base unit for storage.

19. The method of claim 18, further comprising:
   automatically storing the outgoing message received from the handset in the second memory section as a custom outgoing message.

20. A method of using a cordless telephone system, wherein the cordless telephone system includes an outgoing message identifier database of its a base unit that stores a plurality of outgoing messages, and wherein the outgoing message identifier database has a predetermined amount of storage that is available for storing the outgoing messages, the method comprising:
   receiving an incoming telephone call via the base unit;
   determining that the calling party number of the call is not contained in the outgoing message identifier database of the base unit; and
   in response to said determining, providing a prompt during the call, and associate the calling party number with an outgoing message identifier of the database based on the response of said prompt.

21. The method of claim 20, further comprising:
   presenting a list containing a plurality of outgoing message identifiers in response to the selection of the calling party number for association;
   receiving a selection of one among the plurality of outgoing message identifiers; and
   storing information including the calling party number and the selected one among the plurality of outgoing message identifiers in a calling party record.

22. The method of claim 21, wherein the storing the information comprises:
   sending the calling party number and selected one among the plurality of outgoing message identifiers from a handset of the cordless telephone system; and
   storing the information in a calling party record of the database.

23. The method of claim 22, further comprising displaying the calling party number on a display of the handset.

24. The method of claim 23, wherein the identifying the calling party number comprises using a caller ID function to determine the calling party number and to display the number on the handset.

* * * * *